(12) United States Patent
Hendrickson et al.

(10) Patent No.: US 8,135,178 B2
(45) Date of Patent: Mar. 13, 2012

(54) PROCESS FOR NORMALIZING IMAGES OR OTHER DATA LAYERS

(75) Inventors: Larry Lee Hendrickson, Johnston, IA (US); Rendell Bruce Clark, Mandeville, LA (US)

(73) Assignee: Deere & Company, Moline, IL (US)

( * ) Notice: Subject to any disclaimer, the term of this patent is extended or adjusted under 35 U.S.C. 154(b) by 1110 days.

(21) Appl. No.: 11/733,389

(22) Filed: Apr. 10, 2007

(65) Prior Publication Data

US 2008/0253618 A1    Oct. 16, 2008

(51) Int. Cl.
*G06K 9/00* (2006.01)
(52) U.S. Cl. ............... 382/110; 702/2; 702/5; 47/58.1 R
(58) Field of Classification Search .................. 382/110; 702/2, 5; 47/58.1 R
See application file for complete search history.

(56) References Cited

U.S. PATENT DOCUMENTS

| | | | |
|---|---|---|---|
| 5,389,781 A | 2/1995 | Beck et al. | |
| 5,789,741 A | 8/1998 | Kinter et al. | |
| 6,160,902 A | 12/2000 | Dickson et al. | |
| 6,178,253 B1 | 1/2001 | Hendrickson et al. | |
| 6,366,681 B1 | 4/2002 | Hutchins | |
| 6,393,927 B1 | 5/2002 | Biggs et al. | |
| 6,466,321 B1 | 10/2002 | Satake et al. | |
| 6,529,615 B2 | 3/2003 | Hendrickson et al. | |
| 6,549,852 B2 | 4/2003 | Hanson | |
| 6,553,299 B1 * | 4/2003 | Keller et al. ..................... | 701/50 |
| 6,567,537 B1 | 5/2003 | Anderson | |
| 6,601,341 B2 | 8/2003 | Raun et al. | |
| 6,813,544 B2 | 11/2004 | Hood et al. | |
| 6,880,291 B2 | 4/2005 | Raun et al. | |
| 7,058,197 B1 | 6/2006 | McGuire et al. | |
| 7,068,816 B1 | 6/2006 | Knoblauch et al. | |
| 7,103,451 B2 | 9/2006 | Seal et al. | |
| 7,805,005 B2 * | 9/2010 | Simental et al. .............. | 382/191 |
| 2005/0043614 A1 * | 2/2005 | Huizenga et al. ............. | 600/427 |
| 2005/0098713 A1 * | 5/2005 | Holland ........................ | 250/221 |
| 2008/0304711 A1 | 12/2008 | Scharf et al. | |

FOREIGN PATENT DOCUMENTS

DE    10 2004 055 217 A1    5/2006
EP         0 992 186 B1    4/2003

OTHER PUBLICATIONS

Scharf, Peter et al. Non-Confidential Abstract of Invention: UM Disclosure No. 06UMC025. "Predicting Corn Yield Loss and/or N Rate Needed From Aerial Photographs or Images". University of Missouri, Office of Technology Management & Industry Relations. Mar. 23, 2007.

(Continued)

*Primary Examiner* — Vikkram Bali
*Assistant Examiner* — Katrina Fujita

(57) ABSTRACT

A method of processing vegetation data including the steps of identifying data relating to an agricultural field, segregating areas of predetermined development patterns and prescribing application rates of an agricultural compound. The identifying step includes identifying data relating to an agricultural field representative of areas of predetermined development patterns of vegetation in the field. The segregating step includes segregating the areas of the predetermined development patterns thereby defining segregated areas, other areas in the field being non-segregated areas. The prescribing step including prescribing application rates of an agricultural compound to the non-segregated areas dependent on at least one attribute determined from the data.

20 Claims, 3 Drawing Sheets

OTHER PUBLICATIONS

Sui, R. et. al. Ground-based sensing system for weed mapping in cotton. Computers and electronics in agriculture. Jan. 2008. v. 60, Issue 1, p. 31-38. Retrieved from the Internet: <URL:http://ddr.nal.usda.gov/handle/10113/8828>.

Fletcher, Reginald S, et. al. Surveying Thermally-defoliated Cotton Plots with Color-infrared Aerial Photography. 2007 Plant Management Network. Accepted for pubiication Mar. 29, 2007. Published Jun. 25, 2007. Retrieved from the internet: <URL:http://www.plantmanagementnetwork.org/pub/cm/research/2007/thermal/>.

Noh, H. et. al. A Neural Network Model of Maize Crop Nitrogen Stress Assessment for a Multi-spectral Imaging Sensor. Biosystems Engineering (2006) 94 (4), p. 477-485. Retrieved from the Internet: <URL:http://age-web.age.uluc.edu/faculty/qzhang/Publications/2006BE94(4)Noh.pdf>.

Bajwa, S. G. et. al. Aerial CIR Remote Sensing for Weed Density Mapping in a Soybean Field. 2001 American Society of Agricultural Engineers ISSN 0001-5351. vol. 44(6): 1965-1974. Retrieved from the Internet; <URL:http://asae.frymulti.com/azdez.asp?JID=3&AID=6995&ConfID=I2001&v=44&j=6&T=2>.

Brown, R. B. Prescription Maps for Spatially Variable Herbicide Application in No-TIII Com. 1995 American Society of Agricultural Engineers 0001-2352 / 95 / 3806-1659. Retrieved from the Internet: <URL:http://asae.frymulti.com/azdez.asp?JID=3&AID=27992&CID=t1995&v=38&i=6&T=2>.

\* cited by examiner

PROCESS FOR NORMALIZING IMAGES OR OTHER DATA LAYERS

FIELD OF THE INVENTION

The present invention relates to a method for analyzing image information of a field, and, more particularly to a method of analyzing image pixel information of soil or crop parameters in a field.

BACKGROUND OF THE INVENTION

Current approaches to characterize agricultural field variability involve two basic processes. First is the creation of layers that describe variability of soil or crop parameters and then secondly to divide this characterized layer into classes. For example, aerial images can be used characterize parameters describing crop or soil variability. This is in addition to in-field sensors, crop color sensors, soil EM readings or other methods. Current methods for characterizing aerial images involve converting the original multi-spectral data to vegetation indices such as Normalized Difference Vegetation Index (NDVI). This NDVI layer is then divided into classes using an approach such as an equal area or equal increment approach. When divided using equal area, all fields have an equivalent distribution of high and low zones, independent of the level of actual variability, sometimes resulting in prescriptions that may be poorly related to actual crop conditions. When divided on the basis of equal increments (e.g. 31-40, 41-50 . . . ), some classes have little or no representation in some fields. In both cases, it is difficult to compare fields based upon the resultant classification. This problem is exacerbated when images, or other data, are acquired by sensors that may provide different outputs for the same crop situation depending upon conditions such as sensor settings, light level, angles of the images relative to the crops, direction of the planted rows, or differences in crop architecture, such as upright or droopy leaves.

It is known that the normalization of an image layer or sensor values yields a somewhat more consistent relationship to parameters of interest, such as yield and Soil and Plant Analysis Development (SPAD) chlorophyll. A normalized SPAD, based upon the mean pixel value from a high nitrogen reference strip, is a better indicator of nitrogen stress, or yield, than SPAD values alone. The use of relative SPAD and relative yield, based upon the highest or highest mean yield of the field, allows a more consistent relationship when more than one field is used in the analysis. Similar results have been shown for images or sensor results in addition to SPAD values. One of the problems in the prior art is the use of high nitrogen reference strips in that SPAD/pixel/sensor readings often show considerable variability within and between high nitrogen reference strips within the whole field. This makes it difficult to select a value to be used for normalization. A further problem with this approach is that growers are not eager to create high nitrogen reference strips.

What is needed in the art is the ability to select a target or best representative pixel value without the need to establish a high nitrogen reference strip.

SUMMARY OF THE INVENTION

The present invention provides a method for normalizing images or other data layers and for identification of low vegetation zones and weedy patches.

The invention in one form is directed to a method of processing vegetation data including the steps of identifying data relating to an agricultural field, segregating areas of predetermined development patterns and prescribing application rates of an agricultural compound. The identifying step includes identifying data relating to an agricultural field representative of areas of predetermined development patterns of vegetation in the field. The segregating step includes segregating the areas of the predetermined development patterns thereby defining segregated areas, other areas in the field being non-segregated areas. The prescribing step including prescribing application rates of an agricultural compound to the non-segregated areas dependent on at least one attribute determined from the data.

DETAILED DESCRIPTION OF THE INVENTION

Figure 1:
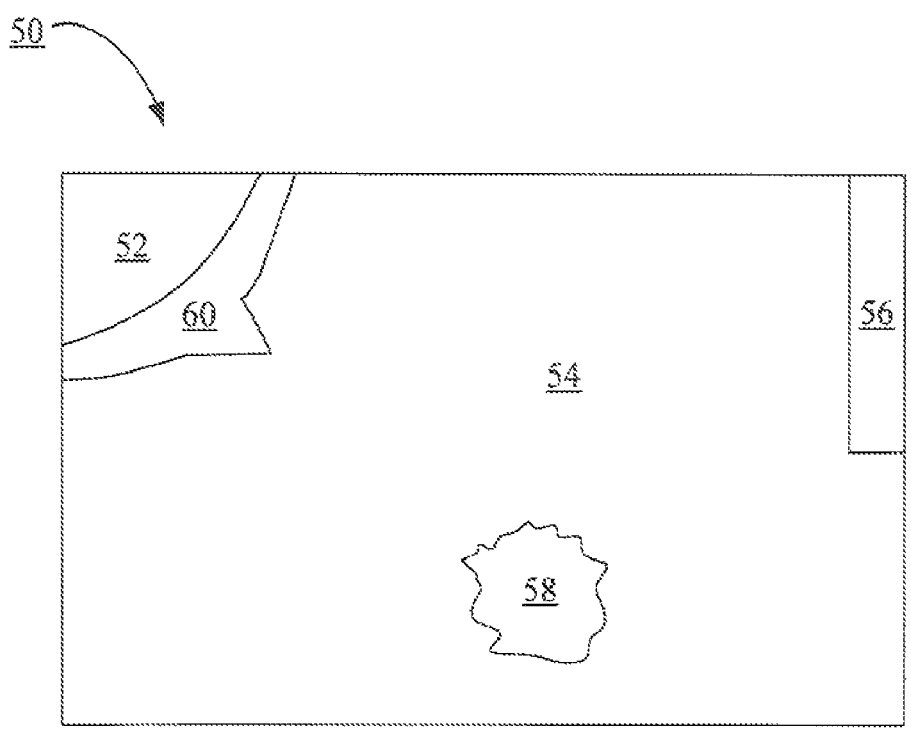
FIG. 1 schematically represents pixel data of an agricultural field that is used to illustrate the methods of the present invention.
Figure 2:
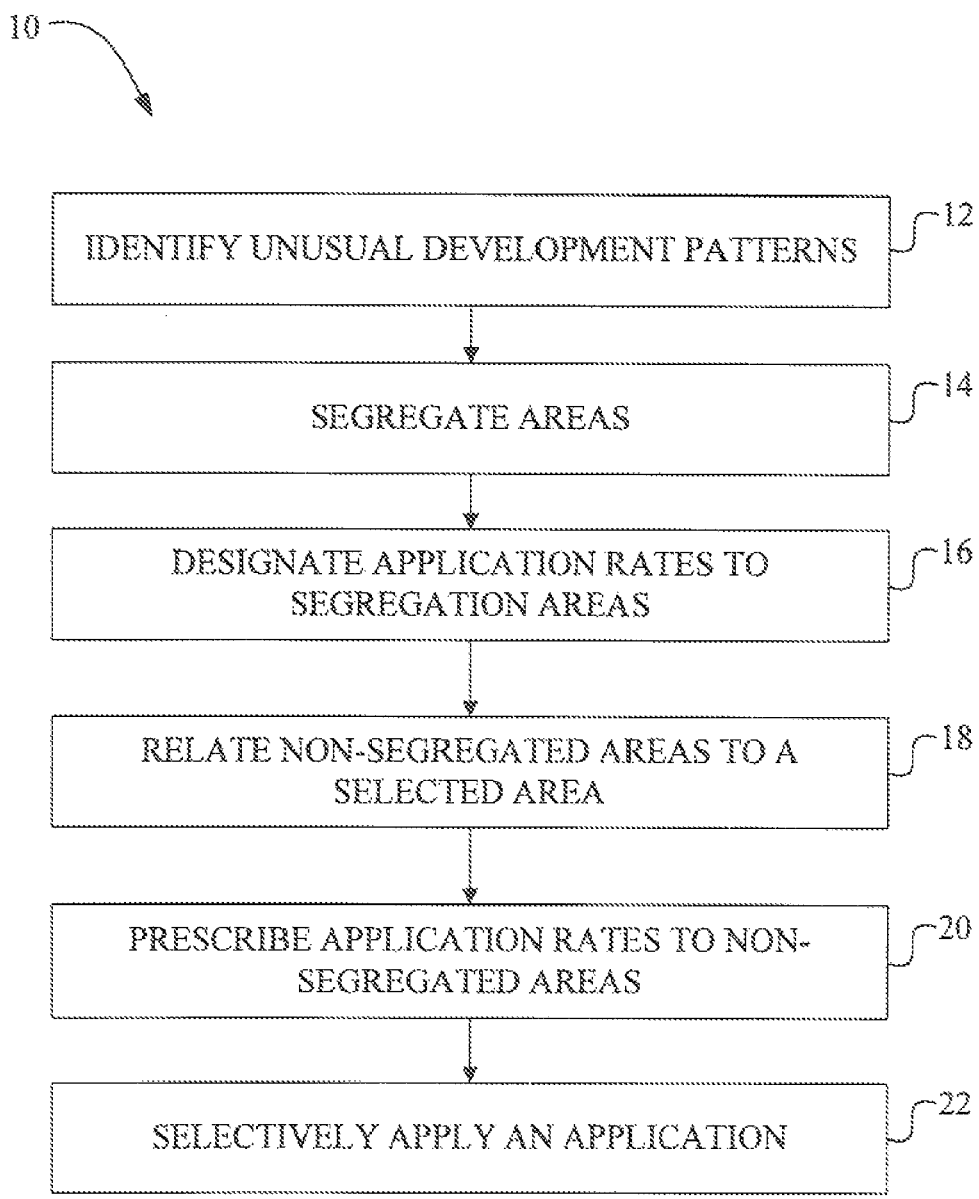
FIG. 2 is a block diagram of one embodiment of a method of processing vegetation data of the present invention.

Referring now to the drawings, and, more particularly to FIGS. 1 and 2, there is shown a method 10 that includes an approach to normalizing images or other layers based upon the best portion of a field 50 and to identify areas of field 50 with limited vegetation or excessive vegetation such as weedy patches. A tool can be used to optimize the prescriptions or other operational decisions that result in application rates of an agricultural compound that is then applied to the selected field. At step 12, areas are identified in the field having unusual development patterns, which might require special treatments thereto.

Often decisions are based upon the assumption that the level of input from an image can be directly related to the extent of crop canopy/canopy color. The term canopy is also used herein to indicate the extent of vegetation. These attributes may indicate more nitrogen is present and that reduced canopy areas may require additional nitrogen. This relationship often results in the incorrect application of compounds, such as nitrogen to areas of the field that have little canopy or that have excessive canopy. Excessive canopy can occur when the crop is double planted or there is simply a weedy patch. To eliminate this incorrect application a graphical user interface is utilized where the layer describing the vegetation status, such as NDVI is overlaid with a color infrared (CIR) layer. This provides for a more visually interpretable indication of canopy differences. The tool allows a user to progressively remove pixels from lower vegetation areas, such as an area 60, causing area 60 to be segregated, at step 14. Pixels can also be segregated or removed from higher vegetation areas that correspond to weedy areas 58 or double planted areas 56. Segregation step 14 allows for the designation of these extreme type areas to be identified and segregated for special consideration. This allows for a particular application rate to be selectively designated at step 16 for the extreme pixel areas that are segregated.

The remaining areas 52 and 54 of the field, the non-segregated portions, receive prescriptions that are directly related to the extent of crop canopy/color, such as NDVI. The progressive removal of pixels at step 14 is monitored by the user using the overlying CIR layer, an RGB layer or other layer that may satisfy the objective, while incrementally selecting higher and/or lower pixels based upon the values of the underlying layer, such as NDVI. The CIR layer not only provides the more easily interpretable layer, but also provides a spatial context to select pixels meeting certain criteria. For example, high density pixels with consistent patterns near field borders may be attributed to double planted areas 56, while weedy patches 58 often have a geometrical pattern or spatial distribution that is easily distinguished. Neither of these could be confidently selected based upon an NDVI value alone. The process can be used independently of a normalization process or can be used prior to, or following, the normalization process.

After certain areas have been segregated in step 16 the pixels in the non-segregated areas 52 and 54 are reviewed and are then related to a selected best area in the field, at step 18. This is a normalization process that removes variability due to differences in the camera, sensor, instrument calibration, light availability and other factors that can cause variability in the pixel data relating to the crop. It also removes variability due to crop architecture, such as droopy or upright leaves, or the stage of growth of the crop. For example, in the case of nitrogen stress there is an assumption that some portion of the field has sufficient nitrogen, and the remainder of the field is related to this best area, also known as the best pixel value or best pixel data. This best pixel value is considered to be a 100% value, which may be below the threshold value that defines a segregated area containing excessive vegetation. Also, the best pixel value can be based upon a statistical derivative of the non-segregated area, such as a $90^{th}$ percentile value. Following the normalization process at step 18 it then becomes possible to compare fields with each other based upon the magnitude and extent of stressed areas within each field.

Fields can then be prioritized based upon the distribution of stressed areas. The application of agricultural compounds can then be applied to the fields based upon the prioritization assigned to each field or areas of the fields. Field ranking is utilized to provide for optimal use and timing of needed applications of agricultural compounds.

The foregoing includes a user selection of all pixels that are not representative of the crop, such as double planted areas 56, weedy areas 58, etc., that gives rise to a non-segregated normalized layer. The pixels that are in the excessive vegetation segregated area typically have values greater than the best value pixel in the non-segregated normal areas. The highest pixel value in the non-segregated area is identified at step 18 and that pixel value is then used as the denominator for application to all pixels in the non-segregated area, and the conversion to a percentage by multiplying by 100. This results in a layer where all representative pixels are related to the best pixel value selected from the non-segregated areas of the field. This is expressed by the equation: Normalized Value=Current Pixel Value/Best Pixel Value×100. Based upon the normalized values assigned to each pixel, application rates are prescribed for the non-segregated areas based on the relative pixel values determined at step 20. The agricultural input or compound, such as a nitrogen fertilizer, is then selectively applied at step 22 based upon the assigned application rate that is dependent upon the normalized pixel values described above. The application device is geo-located and applies the prescribed application rates to areas in the field that correspond to the pixel locations. The application rates, which are assigned at step 16 to the segregated areas, may include the non-application of nitrogen or other inputs to such areas as drowned out areas or areas having excessive canopy. Additionally, a selective weed control compound may be utilized in certain segregated areas that are identified as weedy patches.

Figure 3:
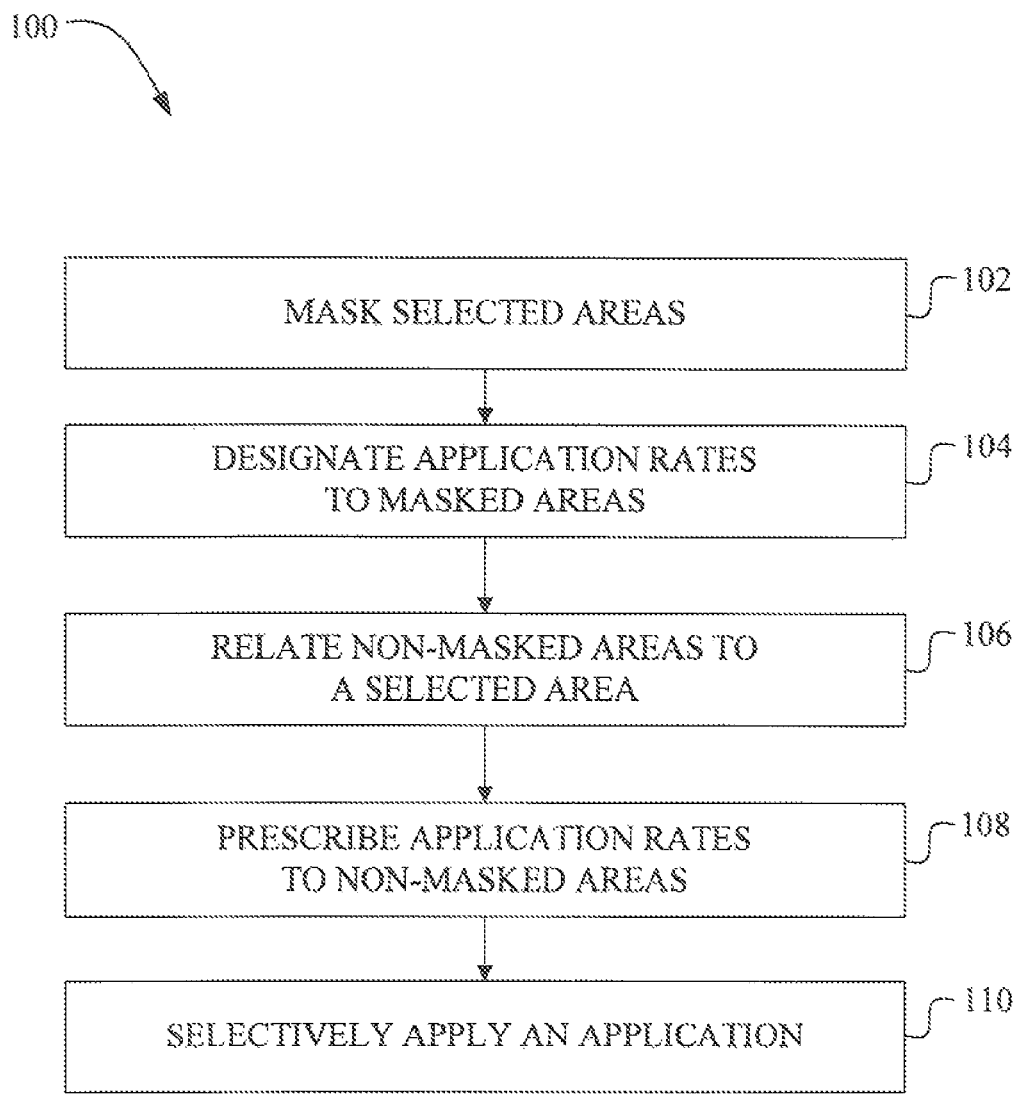
FIG. 3 is another block diagram of another embodiment of a method of processing vegetation pixel data of the present invention.

Now, additionally referring to FIG. 3, process 100 illustrates a masking of selected areas at step 102 in which a portion of the pixels may be selected to mask out areas with different crop varieties to thereby allow the relative characterization of one variety of crop at a time. In addition, masking step 102 can be carried out on all non-crop pixels, such as grass covered areas within vineyards or orchard areas, before the normalization step. Masking also allows comparisons to other fields to become more effective, particularly if things such as grass waterways 60 are masked out prior to the normalization process. At step 104, application rates can be designated for the masked areas, such as not allowing any application of the agricultural compound in the masked off areas. This masking step can often be accomplished directly using the same selection process as described in FIG. 2, but can also be completed using alternative methods before this process.

The normalization process is described at step 106 in which the non-masked areas are related to a selected area having the best pixel value as described in method 10. At step 108 application rates are prescribed to the non-masked areas at step 108. The agricultural compound is selectively applied at step 110 to the field area. The combination of method 100 and method 10 can be utilized to mask selected areas prior to the segregation described in method 10.

The normalization process of the present invention allows for the contrasting of fields with one another thereby allowing the identification of fields with varying degrees of stress. For example, a field A can have twenty percent of the area of field A being below 85% of the best pixel value, while field B may have only two percent of the field area below 85% of the best pixel value, thereby indicating that field A has a higher level of stress. This analysis then allows a decision maker to identify fields with problems, the extent of the observed problems and to make informed decisions about which fields warrant treatment or warrant priority treatment before other fields. This also allows for the utilization of risk assessment to identify fields that aren't developing according to predefined criteria.

It should be understood that the description utilizing the CIR and NDVI layers is only one example, and other image or vegetation index layers can be used instead of, or in addition to, the CIR and NDVI layers for particular applications. For example, other indices that are more closely related to leaf area index (LAI) or canopy differences can be used instead of NDVI. It is also possible to use different attributes such as the selection of the best chlorophyll pixel and the best canopy density pixel for the same field and to use the combination of these two normalization layers that result, to enable differentiation of areas impacted by such things, as moisture stress, from those areas impacted by nitrogen stress.

Having described the preferred embodiment, it will become apparent that various modifications can be made without departing from the scope of the invention as defined in the accompanying claims.

The invention claimed is:
1. A method of processing image data on vegetation in an agricultural field, the method comprising:
    identifying image data relating to an agricultural field representative of areas of predetermined development patterns of vegetation in the field, the predetermined development patterns comprising a higher vegetation area of weedy patches;

segregating said areas of the predetermined development patterns with said weedy patches thereby defining segregated areas by overlaying a Normalized Difference Vegetation Index (NDVI) with a color infrared layer to select pixels with a geometric pattern or spatial distribution indicative of the weedy patches, other areas in the field being non-segregated areas;

normalizing said image data within said non-segregated area using a best crop area as a reference crop area that has sufficient nitrogen to identify a reference pixel within the reference crop area such that the other pixel data in the non-segregated crop area has normalized pixel values with reference to the reference pixel; and prescribing application rates of an agricultural compound to said non-segregated areas dependent on a crop canopy color determined from said normalized image data based on the NDVI.

2. The method of claim 1, wherein said segregated areas include excessive canopy areas.

3. The method of claim 1, wherein said reference crop area is a selected attribute of said pixel data defining a reference pixel value associated with some portion of the agricultural field with sufficient nitrogen.

4. The method of claim 1, wherein said normalizing step includes dividing pixel data in said non-segregated areas by said reference pixel value and multiplying by 100 to produce a normalized pixel value for each pixel as also defined by the equation: Normalized pixel value=pixel value/reference pixel value×100.

5. The method of claim 4, wherein said prescribing step uses said normalized pixel values to determine said application rates.

6. The method of claim 5, further comprising applying said agricultural compound to said non-segregated areas dependent on said application rates prescribed to said non-segregated areas.

7. The method of claim 6, further comprising assigning at least one application rate to said segregated areas.

8. The method of claim 7, further comprising applying said agricultural compound to said segregated areas dependent on said application rates assigned to said segregated areas.

9. The method of claim 8, further comprising masking selected pixels of said data from being used by said identifying step, said segregating step and said prescribing step.

10. The method of claim 1, further comprising prioritizing a plurality of fields after applying said steps of identifying, segregating and prescribing to each of said plurality of fields.

11. The method according to claim 1 wherein, in the segregating step, the geometric pattern or spatial distribution indicative of the weedy patches comprises a nonrectangular geometric pattern or nonrectangular spatial distribution.

12. A method of processing vegetation pixel data, the method comprising:

masking selected pixels from consideration;

identifying unselected pixels relating to an agricultural field representative of areas of predetermined development patterns of vegetation in the field, the predetermined development patterns comprising a higher vegetation area of weedy patches;

segregating said areas of predetermined development patterns with said weedy patches thereby defining segregated areas by overlaying a Normalized Difference Vegetation Index (NDVI) with a color infrared layer to select pixels with a geometric pattern or spatial distribution indicative of the weedy patches, other areas in the field being non-segregated areas;

normalizing said image data within said non-segregated area using a best crop area as a reference crop area that has sufficient nitrogen to identify a reference pixel within the reference crop area such that the other pixel data in the non-segregated crop area has normalized pixel values with reference to the reference pixel; and prescribing application rates of an agricultural compound to said non-segregated areas dependent on a crop canopy color determined from said other pixels based on the NDVI.

13. The method of claim 12, wherein said segregated areas include excessive canopy areas.

14. The method of claim 12, further comprising selecting at least one reference crop pixel in the non-segregated area representative of the best crop area having sufficient nitrogen.

15. The method of claim 14, further comprising normalizing said data within said non-segregated area using said at least one reference crop pixel as a standard, where the at least one reference crop pixel is associated with some portion of the agricultural field with sufficient nitrogen.

16. The method of claim 15, wherein said normalizing step includes dividing pixel data in said non-segregated areas by said reference crop pixel and multiplying by 100 to produce a normalized pixel value for each of said other pixels as also defined by the equation: Normalized pixel value=pixel/reference crop pixel×100.

17. The method of claim 16, wherein said prescribing step uses said normalized pixel values to determine said application rates.

18. The method of claim 17, further comprising applying said agricultural compound to said non-segregated areas dependent on said application rates prescribed to said non-segregated areas.

19. The method of claim 18, further comprising assigning at least one application rate to said segregated areas.

20. The method of claim 19, further comprising applying said agricultural compound to said segregated areas dependent on said application rates assigned to said segregated areas.

* * * * *